United States Patent

Ysbrand et al.

[15] 3,684,147
[45] Aug. 15, 1972

[54] BI-DIRECTIONAL DRIVE MECHANISM WITH HIGH SPEED REVERSE

[72] Inventors: Floyd R. Ysbrand, 208 E. 19th st., Tulsa, Okla. 74119; Richard W. Pembroke, 3681 E. 49th Place, Tulsa, Okla. 74135

[22] Filed: March 8, 1971

[21] Appl. No.: 121,757

[52] U.S. Cl. ....................226/178, 226/188, 74/199
[51] Int. Cl. ..............................................B65h 17/22
[58] Field of Search ....226/178, 188, 49, 51; 74/199, 74/200, 201, 202, 194

[56] References Cited

UNITED STATES PATENTS

| | | | |
|---|---|---|---|
| 2,564,290 | 8/1951 | Williamson et al. | 74/201 |
| 2,925,737 | 1/1960 | Hartman | 74/199 |
| 3,400,599 | 9/1968 | Samuta | 74/194 |

*Primary Examiner*—Richard A. Schacher
*Assistant Examiner*—Gene A. Church
*Attorney*—Head & Johnson

[57] ABSTRACT

In this invention a capstan shaft carries a capstan pulley with two flanges. A first flange provides first and second cylindrical drive surfaces, while a second flange, of smaller diameter, provides a single cylindrical drive surface. A pivoted plate carries two spaced freely rotatable drive transmitting idlers. When the plate is pivoted in a first direction, a first of said drive idlers connects a motor pulley first drive surface in drive relation with a first surface of said first flange to drive said shaft in a first direction. When the plate is pivoted in a second direction a second of said drive idlers connects the motor pulley second drive surface in drive relation with the second surface of said first flange to drive said shaft in a second direction. A third drive idler is adapted to place a motor pulley third drive surface in drive relation with a drive surface of said second flange.

11 Claims, 4 Drawing Figures

PATENTED AUG 15 1972 3,684,147

INVENTOR.
FLOYD R. YSBRAND
RICHARD W. PEMBROKE
BY Head & Johnson
ATTORNEYS 3,684,147

BI-DIRECTIONAL DRIVE MECHANISM WITH HIGH SPEED REVERSE

BACKGROUND OF THE INVENTION

1. Field of the Invention

This invention relates to magnetic recorders, and in particular to small relatively inexpensive units in which it is required to drive the capstan at a constant speed forward, a constant speed backward and a more rapid speed backward.

2. Description of the Prior Art

Many designs of tape drive mechanism have been shown in the prior art, all of which require a great number of idler rollers, shafts, and splined shafts or similar means to engage one or another of the sets of idlers to connect a motor pulley in drive relation to a capstan pulley. All of this involves more parts to produce and more parts to wear, which change the operating conditions.

SUMMARY OF THE INVENTION

In this invention a simple arrangement of two tilting arms combining three drive transmitting idlers are all that are required to provide three positive driving speeds that are accurately maintained during the life of the mechanism. The three driving idlers are independently supported in bearings and are sequentially placed in driving relation between the motor drive shaft and the capstan shaft. Each of these drive idlers operate respectively between one of three drive surfaces on a motor pulley and one of three drive surfaces on a capstan pulley. The motor and capstan pulleys are of rigid material, such as metal which can be machined to a precise diameter and thus provide a precise speed ratio between the motor and capstan shafts, irrespective of the diameter, and possible change in diameter of the drive elements, which are idlers between the motor and capstan pulleys. The second tilting arm, which is interlocked to operate only when the first tilting arm is in the non-tilted or neutral position, brings a third drive idler into contact between a third drive surface of the motor pulley and a third drive surface of the capstan pulley.

It is an object of this invention, to provide, in a magnetic recorder, a simple inexpensive mechanism, with few moving parts, to provide three different drive conditions between a motor shaft and a capstan shaft with precise drive ratios in each condition.

Further objects and details of this invention will be understood from the following description taken in conjunction with the attached drawings, in which the same numerical designation represents the same part in each drawing.

DESCRIPTION OF THE PREFERRED EMBODIMENT

Figure 1:
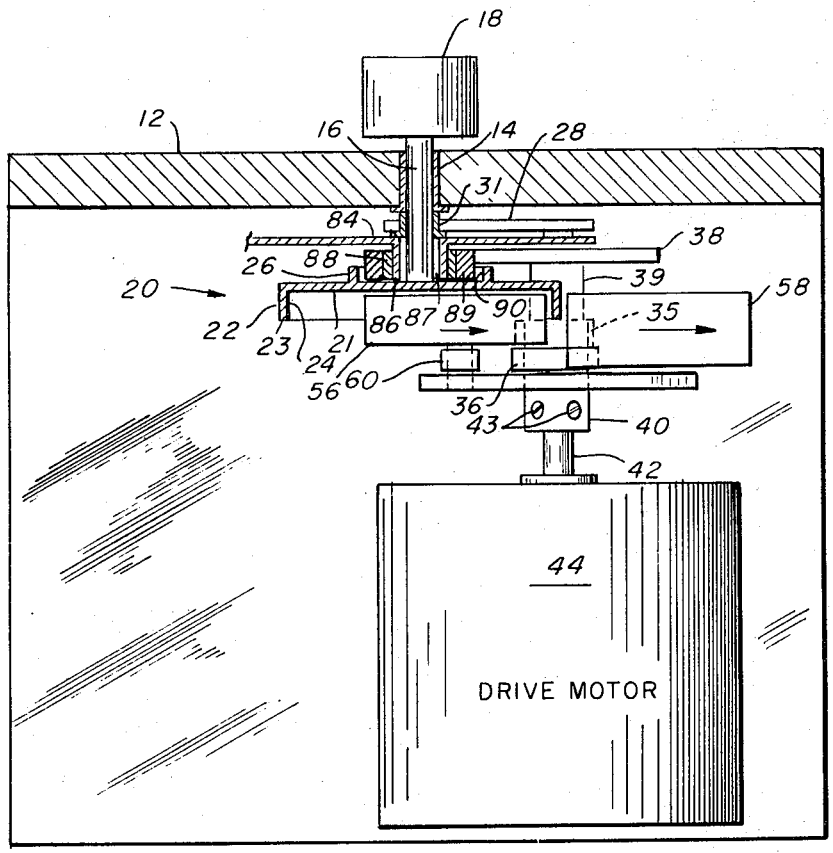
FIGS. 1 and 2 represent partial plan and elevation views of one embodiment of this invention covering principally the driving of two pairs of driving and driven surfaces.

Referring to the drawings, and in particular to FIG. 1 we show the drive mechanism for a magnetic recorder. A motor 44 is mounted on the base 10, which supports a vertical plate or frame 12. There is a bearing 14 in the frame that supports a capstan shaft 16. The capstan shaft supports a capstan 18 on the front side of the frame and a capstan pulley 20 on the back side of the frame. The remaining portion of the magnetic tape handling mechanism is well known in the art and need not be described further at this time. This invention is primarily concerned with the means to drive the capstan.

There is a positioner plate 28, with a bearing 31 which is slipped over the capstan shaft between the capstan pulley and the back side of the frame. This positioner plate 28 carries two spaced cylindrical studs 32 and 33. The three elements, bearing 31 and studs 32, 33 are arranged in a generally triangular arrangement. On the stud 33 is journaled a motor pulley 39. This carries three drive surfaces 35, 36, 38 each of which can be of different diameter as required. The motor pulley 39 carries a hub 40 into which the motor shaft 42 is inserted and fastened with set screws 43.

The spacing between the bearing 31 and the stud 33 is precisely determined during machining of the positioner plate 28. Now when the motor is mounted to base plate 10 all that is required to align the parts is to adjust the position of the motor in the direction of the arrows 48, 49 (permitted by the slots 47 in the base) and permit the positioner plate to rotate about capstan shaft until all the drive parts are in precise operation. Then the motor is clamped by means of screws 45 and washers 46.

There is a pivot assembly 50 that has a single bearing 32 and two spaced studs 51, 52, all three arranged in an approximately isosceles triangular shape with the bearing on the apex. The two studs, 51, 52 carry bearings 53, 54 respectively which support idler driving elements 56, 58. The studs on the pivot assembly 50 face toward the positioner, while the studs on the positioner 28 face toward the pivot assembly. Thus, as the pivot assembly is placed over the positioner with bearing 30 over stud 32, the two drive idlers 56, 58 will be spaced apart and slightly out of contact with motor pulley surfaces 35, 36 respectively.

The capstan pulley 20 is designed with a principle wall 21 perpendicular to shaft 16. On one side this carries a cylindrical flange 23 with two cylindrical drive surfaces 24, 22 respectively on the inside and on the outside surfaces of flange 23. On the other side of the plate 21 facing the frame is a cylindrical flange 26 of smaller diameter than the flange 23, which carries on its inside surface a drive surface, 90.

The spacing between surfaces of the two driving idlers 56 and 58 is such that the flange 23 fits between them. Now, by rotating the pivot assembly in clockwise direction the drive idler 58 is placed in driving relation between drive surface 36 of the motor pulley and drive surface 22 of the capstan pulley. Conversely, by rotating the pivot assembly counterclockwise, the driving idler 56 is brought into driving contact with the motor pulley drive surface 35 and the capstan pulley drive surface 24. The diameters of the motor pulley surfaces 35, 36 and the capstan pulley surfaces 22, 24 can be chosen to provide any speed ratios desired.

The pivot assembly 50 carries an arm 64 which is of magnetic material. Two magnet assemblies 65, 66, with operating coils 67, 68 connected by leads 69, 70 respectively are positioned on either side of the arm 64. The arm is restrained by springs 71, 72 to be centered in the gap between the two magnets when neither coil is energized. When coil 68 is energized, for example, by placing an appropriate current through leads 70, the arm 69 will be pulled to the right, causing clockwise rotation of the pivot assembly and bringing driving idler 58 into contact between drive surfaces 36 and 22 to drive the capstan forward, conversely, applying operating current to coil 67 will bring driving idler 56 into contact with drive surfaces 35 and 24 to drive the capstan in reverse. As shown in FIG. 1, appropriate thicknesses of drive idlers 56 and 58 can be provided, with spacer 60, to facilitate this action. Since the surfaces 35,36 and 22, 24 are preferably metal surfaces, they will have minimum wear and maintain their true diameters. Also, since the diameter of the drive idlers 56, 58 is not critical since the arm 64 will rotate until there is adequate pressure contact between the idlers and the drive surfaces, the drive ratios between the motor and capstan will remain constant throughout the life of the machine. Furthermore, since the driving idlers 56, 58 are out of contact except when the motor is driving the capstan, there is no chance for flats to develop on the surfaces of the idlers. It will be clear that this condition is ensured if the power for the magnets 65, 66 is derived from the power applied to the motor leads, as is well known in the art.

Figure 3:
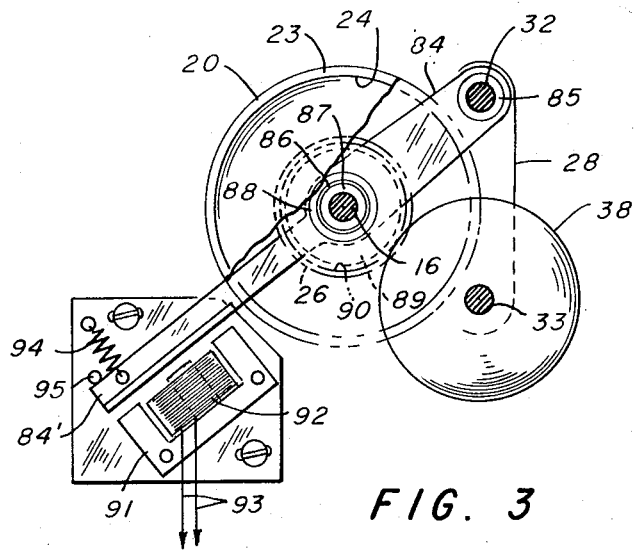
FIG. 3 represents a partial elevational view of one embodiment of this invention covering principally the driving of a third pair of driving and driven surfaces.

Referring now to FIGS. 3 and 1 I show details of the high speed rewind mechanism. An arm 84 with bearing 85 is positioned over stud 32 on positioner plate 28. The arm 84 has a cylindrical flange 86 which surrounds capstan shaft 16 and has an inner diameter of such size that it provides sufficient clearance 87 for the arm 84 to rotate about stud 32. The flange 86 carries a bearing 88 which supports driving idler 89. The driving idler 89 is positioned inside the flange 26 of the capstan pulley 20, and is adapted, as the arm 84 is rotated counterclockwise, to contact the drive surface 90 on the inside of flange 26.

Drive surface 38 of the drive pulley 39 is positioned adjacent flange 26, with the two drive surfaces (38, convex, and 90, concave) adjacent and substantially tangent. Thus, the driving idler, positioned at the point of tangency, can be in drive transmitting contact with both surfaces when the arm 84 is rotated.

An extension 84 of the arm 84 is positioned as an armature across the magnet assembly 91 which has an excitation coil 92 with leads 93. The armature is restrained by spring 94 to be pulled back against stop pin 95. In this position the drive idler 89 is out of contact with the drive surfaces. Then the proper actuating voltage is applied to leads 93, the arm is pulled counterclockwise and the motor pulley then drives the capstan pulley in reverse at high speed.

It is clear that in all three drive conditions, only one surface of the drive pulley is in contact with the appropriate surface of the capstan pulley, and the other drive surfaces must be disengaged. Therefore the three operating magnets must be interlocked so that only one at a time can be operated. This art is well known and need not be discussed further.

Figure 2:
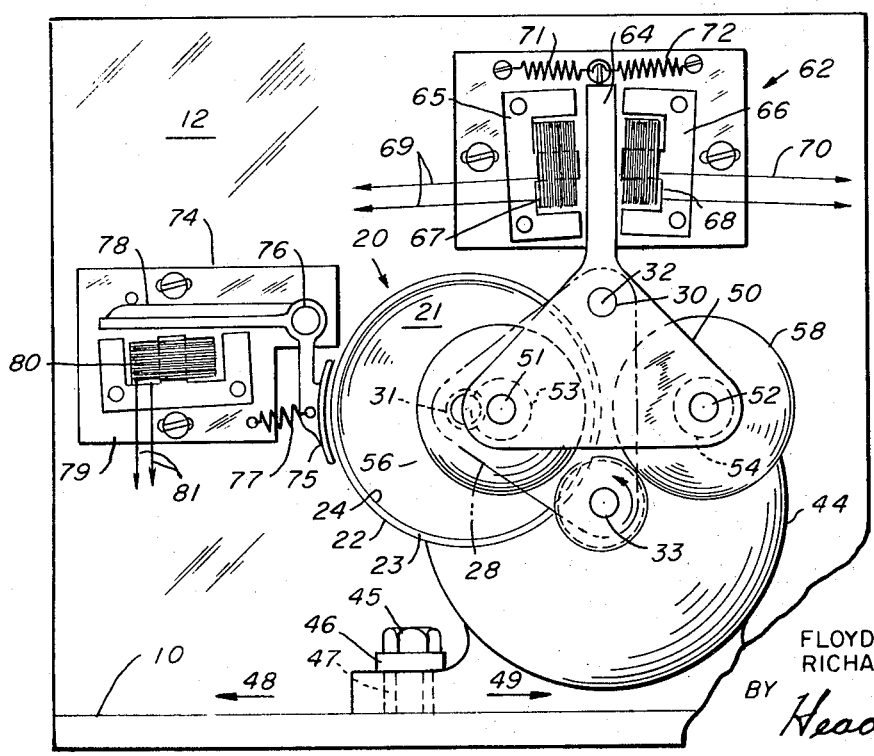

In FIG. 2 is shown another feature, a brake mechanism. This comprises a brake shoe 75 on an arm pivoted at 76 and carrying armature 78. The armature spans a magnet structure 79 with operating coil 80 and leads 81. The brake is adapted to contact drive surface 22 and is held out of contact by spring 77. When the magnet 80 is excited, the armature is drawn in and the brake applied to the capstan pulley.

Figure 4:
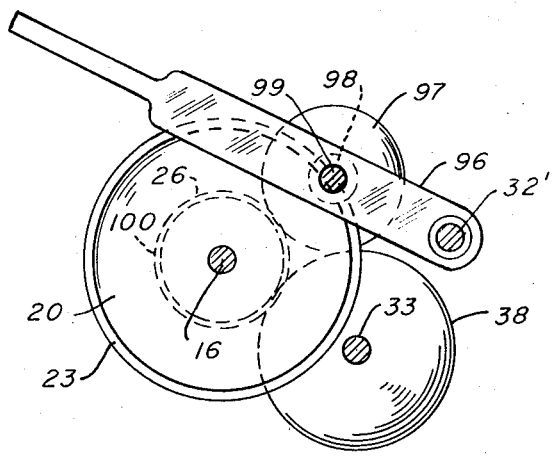
FIG. 4 is an alternate embodiment of part of FIG. 3.

Driving surfaces 36 and 35 cooperate respectively with driven surfaces 22 and 24. By proper choice of diameters the speed ratio forward and backward can be identical. The third pair of surfaces are 38 and 90. Driven surface 90 is shown as an internal concave surface. However, by reversing the direction of rotation of the drive motor, the third driving surface can be on the exterior of flange 26. This is shown in FIG. 4, which is a new embodiment of FIG. 3. Here are shown the capstan pulley 20 with annual rim or flange 23, driven in accordance with FIG. 3. In FIG. 4 the arm 96 pivoted on pin or stud 32' carries pin 99 on which is bearing 98 and drive transmitting idler roller 97. Roller 97 is adapted, when arm 96 is rotated counterclockwise to contact drive surface 38 and driven surface 100 on the exterior of flange 26.

It will be seen from the foregoing description that this invention involves a very simple drive assembly which comprises two pulleys, a driving pulley and a driven pulley. There are three drive surfaces on the driving pulley which operate respectively with three driven surfaces on the driven pulley. Three driving idler rollers are adapted selectively and sequentially to be placed in drive transmitting operation with the three pairs of driving surface, respectively, to provide three different speeds and directions of the driven pulley. The drive assembly is self-contained and needs only to have the driving shaft and driven shaft inserted.

We have shown a basic three-speed drive system, with two low-speed drives, one forward and one backward, and a single high-speed drive in the backward or re-wind direction. Also, FIG. 4 is shown as an alternative to FIG. 3 as a fast rewind, available by reversing the drive motor direction of rotation. It will be obvious, therefor, that what we have shown can be used as a four-speed drive system, with two speeds forward, a low speed as in FIG. 2 and a high speed as in FIG. 4, plus two speeds in reverse (or re-wind) a low speed as in FIG. 2 and a high speed as in FIG. 3.

One of the important features of this invention is that the drive ratios remain constant with prolonged use. This is provided by making the driving and driven pulleys and surfaces of a rigid, not easily abradeable material such as metal or plastic, whereby these surfaces will show very little wear. On the other hand, the driving idlers, which provide the drive transmitting effort, can wear and be of varying diameter, without affecting the drive ratios. The material of the driving rollers can be slightly compliant and of a high contact friction character, such as hard rubber, etc.

While we have shown specific embodiments, in view of the principles shown and described in the specification one skilled in the art will be able to devise additional embodiments, all of which are felt to be part of this invention, the scope of which is to be determined from the scope of the appended claims.

What is claimed:

1. In a magnetic tape driving system in which the tape is driven by pressure contact against a rotating cylindrical capstan, said capstan adapted to be rotated in either direction, the improvement in means to drive said capstan comprising a driving assembly, comprising:
 a. frame means,
 b. an input driving shaft and an output driven shaft, spaced from and parallel to said driving shaft, and journaled to said frame,
 c. a driving pulley on said driving shaft carrying at least three convex driving surfaces axially spaced along said pulley,
 d. a driven pulley on said driven shaft carrying three driven surfaces, in operating driving alignment perpendicular to said shafts, respectively with said three driving surfaces, at least one of said driven surfaces convex and at least one of said driven surfaces concave,
 e. said driving and driven pulleys of rigid material, and said driving and driven surfaces adapted to be operated in pairs,
 f. at least three drive-transmitting idler rollers adapted respectively to be placed in drive-transmitting contact with each of said pairs of driving and driven surfaces, and
 g. means to selectively and sequentially place said idler rollers in drive transmitting contact with said pairs of driving and driven surfaces.

2. A driving assembly as in claim 1 in which said driven pulley includes a first flange with driven surfaces on the inside and the outside of said first flange, and including a second flange of smaller diameter than said first flange, one of the surfaces of said second flange being the third driven surface.

3. A driving assembly as in claim 2 in which the third driven surface is on the inside of said second flange.

4. A driving assembly as in claim 2 in which the third driven surface is on the outside of said second flange.

5. A driving assembly as in claim 2 including a fourth convex surface on said driving pulley, and in which both surfaces of said second flange comprise driven surfaces.

6. A driving assembly as in claim 2 including first pivoted arm means carrying a third drive-transmitting idler roller journaled on a pivot stud perpendicular to said arm, said third roller adapted, when said first arm is rotated around said pivot, to be placed in drive-transmitting contact between a third driving surface and said second flange.

7. A driving assembly as in claim 6 including second pivoted arm means carrying a fourth drive-transmitting idler roller journaled on a pivot stud perpendicular to said arm, said fourth roller adapted, when said second arm is rotated around said pivot, to be placed in drive-transmitting contact between a fourth driving surface and said second flange.

8. A driving assembly as in claim 6 including interlock means associated with said electromechanical means to prevent the contact of more than one of said idlers to said drive surfaces at one time.

9. A driving assembly as in claim 7 including interlock means to prevent the contact of more than one of said idlers to said drive surfaces at one time.

10. A driving assembly as in claim 1 including plate means pivoted to said frame, said plate means carrying two spaced drive-transmitting idler rollers journaled on two spaced studs perpendicular to said plate, one of said rollers adapted to contact a first pair of driving and driven surfaces when said plate is pivoted in one direction, and the second of said rollers adapted to contact a second pair of surfaces when said plate is pivoted in the other direction.

11. A driving assembly as in claim 1 including electromechanical means to place said drive-transmitting idler rollers into drive-transmitting contact with said pairs of surfaces.

* * * * *